(12) United States Patent
Binion et al.

(10) Patent No.: US 10,423,989 B2
(45) Date of Patent: Sep. 24, 2019

(54) SYSTEMS AND METHODS TO ASSESS THE CONDITION OF A VEHICLE

(71) Applicant: STATE FARM MUTUAL AUTOMOBILE INSURANCE COMPANY, Bloomington, IL (US)

(72) Inventors: Todd Binion, Bloomington, IL (US); Kelly S. Minter, Normal, IL (US); Heidi Brown-McCreery, Bloomington, IL (US); Michael Harris, Normal, IL (US); Jeremy Myers, Normal, IL (US); Brian Fields, Normal, IL (US); Joe Harr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 48 days.

(21) Appl. No.: 14/047,256

(22) Filed: Oct. 7, 2013

(65) Prior Publication Data
US 2015/0100504 A1 Apr. 9, 2015

(51) Int. Cl.
*G06Q 30/02* (2012.01)

(52) U.S. Cl.
CPC ................................ *G06Q 30/0278* (2013.01)

(58) Field of Classification Search
CPC ............. G07C 5/08; G07C 5/02; G06Q 30/02
See application file for complete search history.

(56) References Cited

U.S. PATENT DOCUMENTS

| | | | |
|---|---|---|---|
| 3,702,989 A | 11/1972 | Provenzano, Jr. et al. |
| 3,866,166 A | 2/1975 | Kerscher, III et al. |
| 4,027,289 A | 5/1977 | Toman |
| 4,159,531 A | 6/1979 | McGrath |
| 4,258,421 A | 3/1981 | Juhasz et al. |
| 4,843,575 A | 6/1989 | Crane |
| 5,361,201 A | 11/1994 | Jost et al. |
| 5,797,134 A | 8/1998 | McMillan et al. |
| 5,941,915 A | 8/1999 | Federle et al. |
| 6,173,310 B1 | 1/2001 | Yost et al. |
| 6,289,332 B2 | 9/2001 | Menig et al. |

(Continued)

OTHER PUBLICATIONS

Office Action in U.S. Appl. No. 14/047,268 dated Jan. 29, 2014.

(Continued)

*Primary Examiner* — Julie M Shanker
(74) *Attorney, Agent, or Firm* — Marshall, Gerstein & Borun LLP; Randall G. Rueth

(57) ABSTRACT

A computer-implemented method includes receiving a vehicle condition query via a computer network and retrieving condition data corresponding to a vehicle from a vehicle condition database. Further, the method includes determining a condition of the vehicle based on a collective analysis of the condition data, wherein the condition of the vehicle relates to at least one of a quality or a value of the vehicle, and developing one or more condition descriptors reflecting the condition of the vehicle. Still further, the method includes generating a vehicle condition report including an indication of the one or more condition descriptors and communicating, via the computer network, the vehicle condition report to a remote computing device for presentation to a user of the remote computing device.

19 Claims, 4 Drawing Sheets

(56) References Cited

U.S. PATENT DOCUMENTS

| | | | |
|---|---|---|---|
| 6,434,512 B1* | 8/2002 | Discenzo | F16C 19/52 |
| | | | 702/184 |
| 6,502,080 B1 | 12/2002 | Eichorst et al. | |
| 6,526,335 B1 | 2/2003 | Treyz et al. | |
| 6,654,770 B2* | 11/2003 | Kaufman | 340/1.1 |
| 6,711,495 B1 | 3/2004 | Ukai et al. | |
| 7,111,005 B1 | 9/2006 | Wessman | |
| 7,174,243 B1 | 2/2007 | Lightner et al. | |
| 7,338,443 B1 | 3/2008 | Tucker | |
| 7,676,306 B2 | 3/2010 | Kubo et al. | |
| 7,711,574 B1 | 5/2010 | Bradley et al. | |
| 7,765,039 B1 | 7/2010 | Hagenbuch | |
| 8,014,974 B2 | 9/2011 | Doddek et al. | |
| 8,140,358 B1 | 3/2012 | Ling et al. | |
| 8,838,324 B2 | 9/2014 | Suzuki et al. | |
| 2002/0065698 A1 | 5/2002 | Schick et al. | |
| 2002/0143646 A1 | 10/2002 | Boyden et al. | |
| 2002/0144233 A1 | 10/2002 | Chong et al. | |
| 2003/0009270 A1 | 1/2003 | Breed | |
| 2003/0033175 A1 | 2/2003 | Ogura et al. | |
| 2003/0120472 A1 | 6/2003 | Lind | |
| 2004/0019517 A1 | 1/2004 | Sennott | |
| 2004/0024483 A1 | 2/2004 | Holcombe | |
| 2004/0153356 A1 | 8/2004 | Lockwood et al. | |
| 2004/0268248 A1 | 12/2004 | Makela | |
| 2005/0154657 A1 | 7/2005 | Kim et al. | |
| 2006/0033625 A1 | 2/2006 | Johnson et al. | |
| 2006/0053075 A1 | 3/2006 | Roth et al. | |
| 2006/0114531 A1 | 6/2006 | Webb et al. | |
| 2006/0167593 A1 | 7/2006 | Eckles | |
| 2006/0229777 A1* | 10/2006 | Hudson | G01M 15/05 |
| | | | 701/31.4 |
| 2006/0253293 A1 | 11/2006 | Osborn | |
| 2007/0043878 A1 | 2/2007 | Carlson et al. | |
| 2007/0136077 A1 | 6/2007 | Hammond et al. | |
| 2007/0179692 A1 | 8/2007 | Smith et al. | |
| 2008/0046383 A1* | 2/2008 | Hirtenstein et al. | 705/400 |
| 2008/0316006 A1 | 12/2008 | Bauman et al. | |
| 2009/0177352 A1 | 7/2009 | Grau et al. | |
| 2009/0327977 A1 | 12/2009 | Bachfischer et al. | |
| 2010/0005010 A1* | 1/2010 | Chenn | 705/27 |
| 2010/0106534 A1 | 4/2010 | Robinson et al. | |
| 2010/0274571 A1 | 10/2010 | McFall et al. | |
| 2010/0318451 A1 | 12/2010 | Niccolini et al. | |
| 2011/0012720 A1* | 1/2011 | Hirschfeld | 340/439 |
| 2011/0046842 A1 | 2/2011 | Smith | |
| 2011/0251734 A1 | 10/2011 | Schepp et al. | |
| 2011/0264278 A1 | 10/2011 | Gilbert et al. | |
| 2012/0197699 A1 | 8/2012 | Snell et al. | |
| 2012/0209634 A1 | 8/2012 | Ling et al. | |
| 2012/0246036 A1 | 9/2012 | Marr et al. | |
| 2012/0262283 A1 | 10/2012 | Biondo et al. | |
| 2013/0157647 A1* | 6/2013 | Kolodziej | 455/419 |
| 2014/0052501 A1 | 2/2014 | Dickson et al. | |
| 2014/0058618 A1* | 2/2014 | Rude et al. | 701/31.4 |
| 2014/0095047 A1 | 4/2014 | Naylor | |
| 2014/0102104 A1 | 4/2014 | Read | |
| 2014/0289078 A1 | 9/2014 | Paul | |
| 2014/0310186 A1 | 10/2014 | Ricci | |
| 2014/0322676 A1 | 10/2014 | Raman | |

OTHER PUBLICATIONS

Office Action in U.S. Appl. No. 14/047,279 dated Jan. 29, 2014.
Office Action in U.S. Appl. No. 14/047,259 dated Jan. 16, 2014.
Office Action is U.S. Appl. No. 14/047,274 dated Jan. 14, 2014.
Office Action in U.S. Appl. No. 14/047,274 dated Nov. 18, 2014.
Office Action in U.S. Appl. No. 14/047,274 dated Jul. 16, 2014.
CarFax Sample Report, www.CarFax.com, accessed at http://www.carfax.com/phoenix/vehicle_history/SampleReport.cfx?reportName=consumerMobileWeb, archived Nov. 2012, accessed Jul. 2014.
Office Action in U.S. Appl. No. 14/047,259 dated Aug. 1, 2014.
Office Action in U.S. Appl. No. 14/047,268 dated Aug. 1, 2014.
Office Action in U.S. Appl. No. 14/047,279 dated Aug. 7, 2014.
Office Action in U.S. Appl. No. 14/047,268 dated Dec. 19, 2014.
Office Action in U.S. Appl. No. 14/047,279 dated Dec. 23, 2014.
Office Action in U.S. Appl. No. 14/047,259 dated Mar. 2, 2015.
Office Action in U.S. Appl. No. 14/047,268 dated Mar. 26, 2015.
Office Action in U.S. Appl. No. 14/047,274 dated Apr. 9, 2015.
Office Action in U.S. Appl. No. 14/047,279 dated Jun. 25, 2015.
Office Action in U.S. Appl. No. 14/047,259 dated Jul. 8, 2015.
Office Action in U.S. Appl. No. 14/047,268 dated Jul. 9, 2015.
Office Action in U.S. Appl. 14/047,279 dated Oct. 9, 2015.
Office Action in U.S. Appl. No. 14/047,259 dated Oct. 9, 2015.
Office Action in U.S. Appl. No. 14/047,274 dated Dec. 4, 2015.
Office Action in U.S. Appl. No. 14/047,268 dated Dec. 22, 2015.
Office Action in U.S. Appl. No. 14/047,259 dated Feb. 26, 2016.
Office Action issued in U.S. Appl. No. 14/047,268 dated Apr. 29, 2016.
Office Action issued in U.S. Appl. No. 14/047,274 dated Sep. 2, 2016.
Office Action issued in U.S. Appl. No. 14/047,274 dated Jan. 18, 2017.
Office Action issued in U.S. Appl. No. 14/047,274 dated May 3, 2017.
Office Action issued in U.S. Appl. No. 14/047,274 dated Sep. 20, 2017.
Office Action issued in U.S. Appl. No. 14/047,259 dated Mar. 24, 2017.
Office Action issued in U.S. Appl. No. 14/047,259 dated Jun. 14, 2017.
Office Action issued in U.S. Appl. No. 14/047,259 dated Sep. 28, 2017.
Office Action issued in U.S. Appl. No. 14/047,259 dated Jan. 8, 2018.

* cited by examiner

SYSTEMS AND METHODS TO ASSESS THE CONDITION OF A VEHICLE

TECHNICAL FIELD

The present disclosure generally relates to assessing the condition of a vehicle and, more particularly, to a method for gathering and analyzing condition related data.

BACKGROUND

When customers purchase used vehicles, they often encounter the challenge of assessing the actual condition of vehicles with limited access to information about the vehicles. In most cases, customers only have access to general information about vehicles, such as year, make, model, mileage and physical appearance. From such general information, it is impossible to accurately assess the condition of a vehicle, much less how the vehicle was driven (e.g. severe acceleration and braking, towing a trailer, etc.), where the vehicle was driven (rural areas, urban areas, the "salt belt," etc.), and under what conditions was the vehicle driven (e.g. traffic, highway, snow, etc.).

SUMMARY

In one embodiment, a computer-implemented method for assessing a condition of a vehicle comprises receiving a vehicle condition query via a computer network, wherein the vehicle condition query includes an identification of a vehicle, retrieving, with one or more processors, condition data corresponding to the vehicle from a vehicle condition database, wherein a device inside the vehicle generates at least some of the condition data while the vehicle is being operated, and determining, with one or more processors, a condition of the vehicle based on a collective analysis of the condition data, wherein the condition of the vehicle relates to at least one of a quality or a value of the vehicle. Further, the method comprises developing, with the one or more processors, one or more condition descriptors reflecting the condition of the vehicle, generating, with the one or more processors, a vehicle condition report including an indication of the one or more condition descriptors, and communicating, via the computer network, the vehicle condition report to a remote computing device for presentation to a user of the remote computing device.

In another embodiment, a computer-implemented method for reporting vehicle condition information on a computing device, including a display device and a user interface, comprises receiving, via the user interface, information identifying a vehicle, generating, with one or more processors, a vehicle condition query, wherein the vehicle condition query includes the information identifying the vehicle, and sending, via a network interface at the computing device, the vehicle condition query to a server. Further, the method comprises receiving, via the network interface at the computing device, one or more condition descriptors reflecting a condition of the vehicle, wherein at least some of the condition descriptors are based on a collective analysis of a plurality of condition data, wherein a device inside the vehicle generates at least some of the plurality of condition data while the vehicle is being operated, and wherein the condition of the vehicle relates to at least one of a quality or a value of the vehicle. Still further, the method comprises rendering, with one or more processors, an image of the one or more condition descriptors for presentation of the image on the display device.

In yet another embodiment, a computer device for assessing the condition of a vehicle comprises one or more processors and one or more memories coupled to the one or more processors, wherein the one or more non-transitory memories include computer executable instructions stored therein that, when executed by the one or more processors, cause the one or more processors to: receive a vehicle condition query via a computer network, wherein the vehicle condition query includes an identification of a vehicle, retrieve, with one or more processors, condition data corresponding to the vehicle from a vehicle condition database, wherein a device inside the vehicle generates at least some of the condition data while the vehicle is being operated, and determine, with one or more processors, a condition of the vehicle based on a collective analysis of the condition data, wherein the condition of the vehicle relates to at least one of a quality or a value of the vehicle. Further, the one or more memories include computer executable instructions stored therein that, when executed by the one or more processors, cause the one or more processors to: develop, with the one or more processors, one or more condition descriptors reflecting the condition of the vehicle, generate, with the one or more processors, a vehicle condition report including an indication of the one or more condition descriptors, and communicate, via the computer network, the vehicle condition report to a remote computing device for presentation to a user of the remote computing device

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein, the term "vehicle" may refer to any of a number of motorized transportation devices. A vehicle may be a car, truck, bus, train, boat, plane, etc. Additionally, as used herein, the term "driver" may refer to any operator of a vehicle. A driver may be a car driver, truck driver, bus driver, train engineer, captain of a boat, pilot of an airplane, etc.

System Overview

Figure 1:
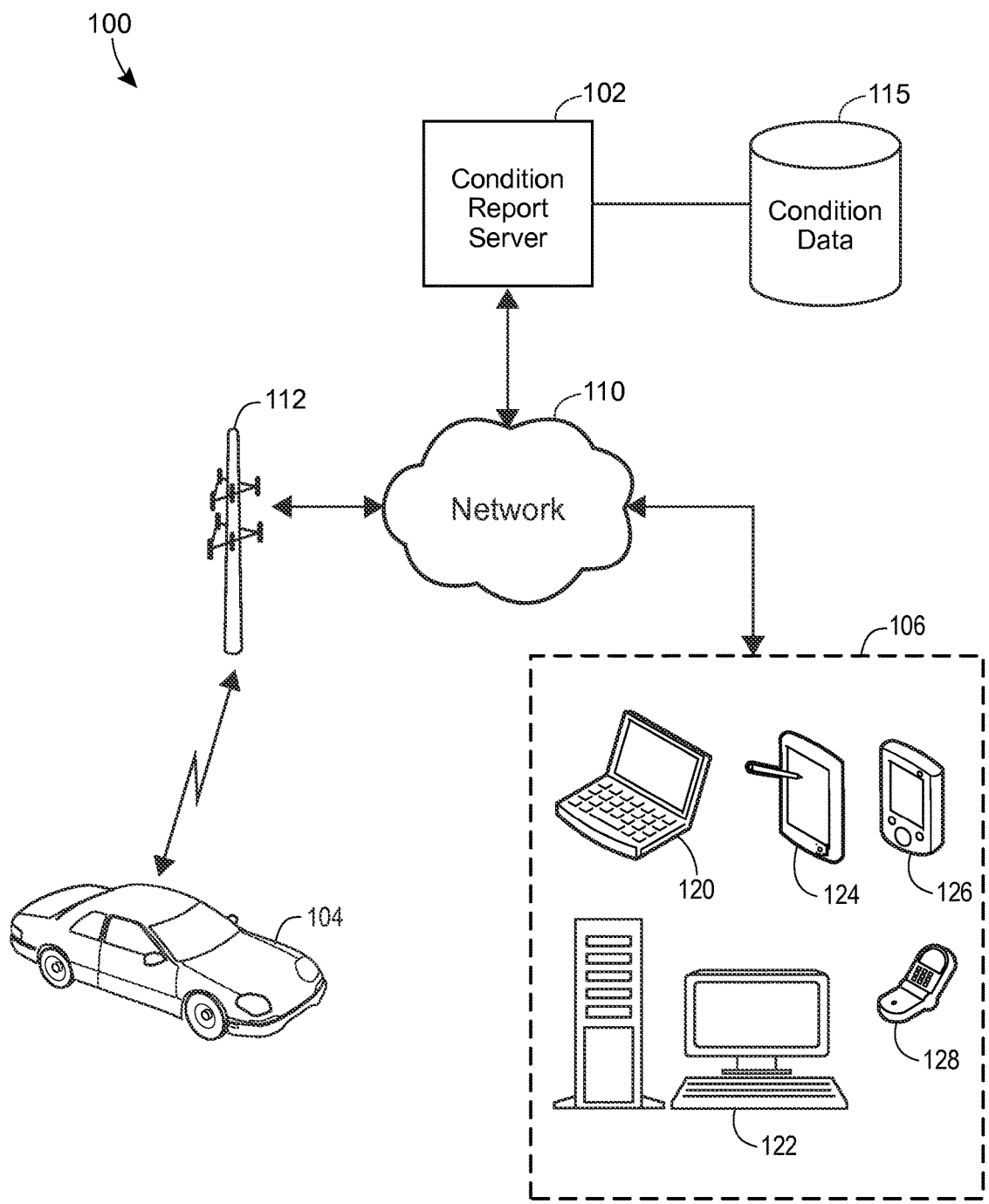
FIG. 1 illustrates an example system in which a condition report server may assess the condition of a vehicle.

FIG. 1 illustrates an example system 100 in which the condition of a vehicle 104 can be assessed. A condition report server 102 and one or more end user devices 106 are communicatively coupled to a network 110. Additionally, the vehicle 104 is communicatively coupled to the network 110 via an antenna 112. The network 110 may be a proprietary network, a secure public internet, a virtual private network or some other type of network, such as dedicated access lines, plain ordinary telephone lines, satellite links, combinations of these, etc. Where the network 110 comprises the Internet, data communications may take place over the network 110 via an Internet communication protocol. Further details of an example condition report server and an example end user device are described with reference to FIG. 2 and FIG. 3, respectively.

In some implementations, the vehicle 104 may upload condition data to the condition report server 102 via the network 110. For example, an on-board computing device (not shown) or end user device disposed in the vehicle 104 may wirelessly upload data from braking, acceleration, motion, force, environment, image, etc. sensors, via one or more wireless interfaces (not shown), for assessing the condition of the vehicle 104. In turn, the condition report server 102 may store the condition data in a condition database 115 that is communicatively coupled to the condition report server 102. The condition database 115 may include an assortment of computer-readable media. By way of example and without limitation, computer-readable media may include both volatile and nonvolatile media, removable and non-removable media.

Although the example system 100 is shown to include one condition report server 102 and five end user devices 106, it is understood that different numbers of servers and end user devices may be utilized. Furthermore, the processing performed by the condition report server 102 may be distributed among a plurality of servers in an arrangement known as "cloud computing," in an implementation. This configuration may provide several advantages, such as enabling near real-time uploads and downloads of information as well as periodic uploads and downloads of information, for example.

Figure 2:
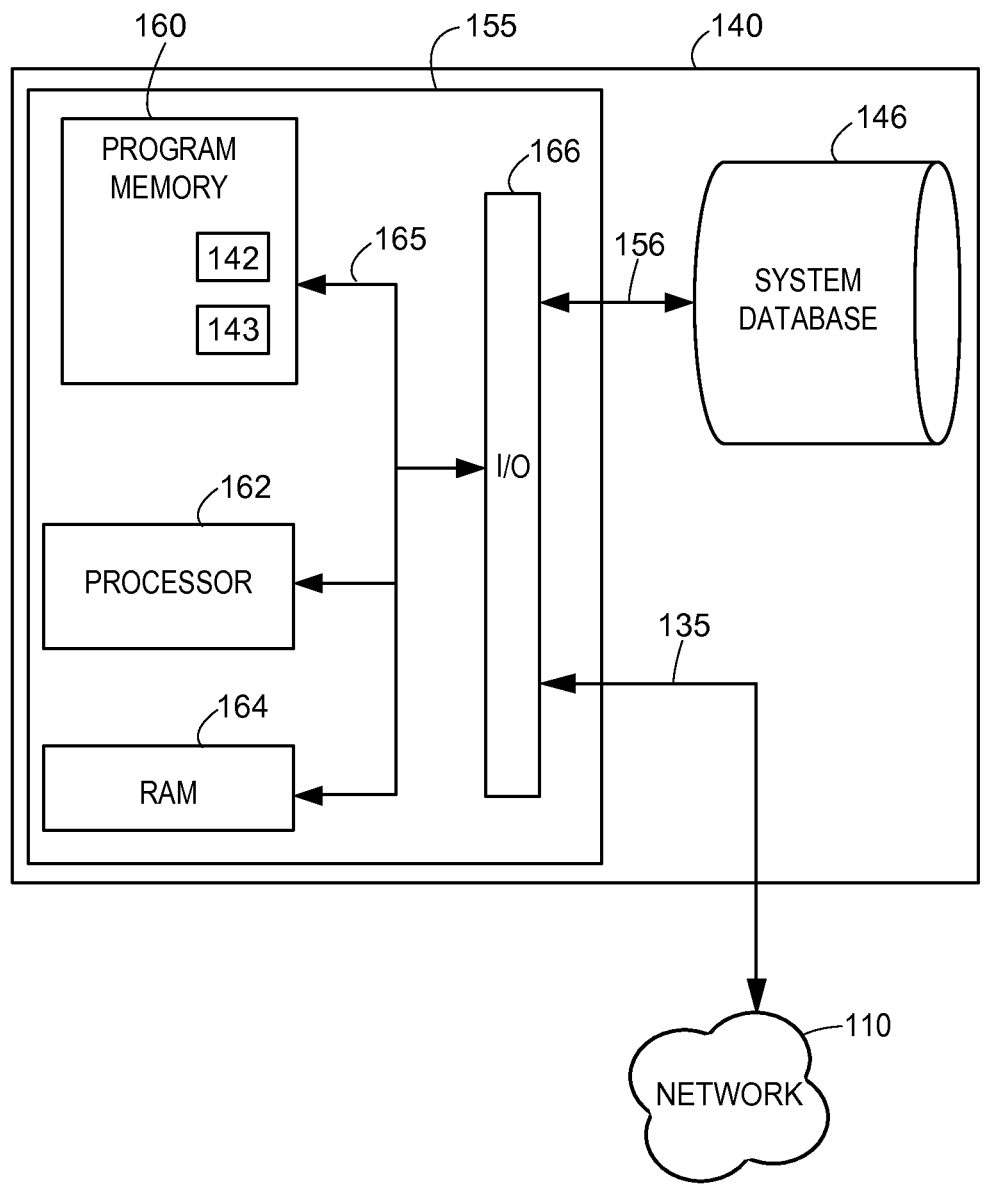
FIG. 2 illustrates an example server that can be implemented as the condition report server illustrated in FIG. 1.

FIG. 2 illustrates an example server 140 that may be implemented as a condition report server, such as the condition report server 102. The example server 140 includes a controller 155 that is operatively connected to the database 146 via a link 156, and it should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. The program memory 160 may be configured to store computer-readable instructions that when executed by the processor 162 cause the server 140 to implement a server application 142 and a web server 143. The instructions for the server application 142 may cause the server 140 to implement the methods described herein.

While shown as a single block in FIG. 2, it will be appreciated that the server application 142 may include a number of different programs, modules, routines, and subroutines that may collectively cause the server 140 to implement the server application 142. It should be appreciated that although only one microprocessor 162 is shown, the controller 155 may include multiple microprocessors 162. Similarly, the memory of the controller 155 may include multiple RAMs 164 and multiple program memories 160. Further, while the instructions for the server application 142 and web server 143 are shown being stored in the program memory 160, the instructions may additionally or alternatively be stored in the database 146 and/or RAM 164. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 130 via a link 135.

Figure 3:
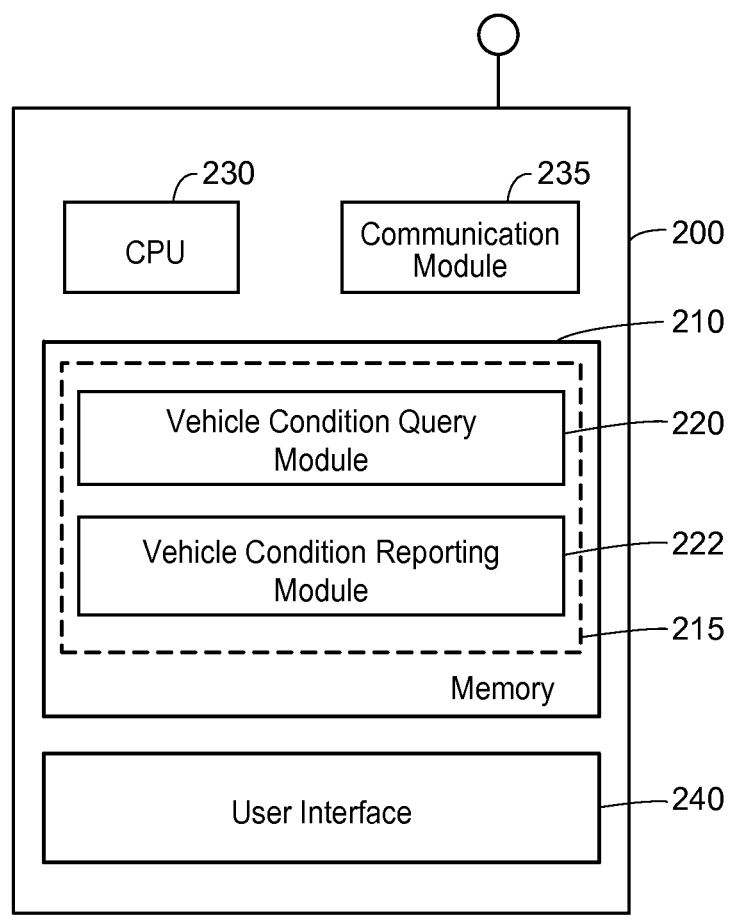
FIG. 3 illustrates an example end user device that can be implemented as one of the end user devices illustrated in FIG. 1.

FIG. 3 illustrates an example end user device 200 capable of reporting vehicle condition information to a customer, as discussed below. The end user device 200 may be implemented as one of the end user devices 106, for example. The end user device 200 includes a computer readable memory 210 in the form of volatile and/or nonvolatile memory such as read only memory (ROM) and random access memory (RAM). The memory 210 may store a vehicle condition reporting tool 215 including a vehicle condition query module 220 and a vehicle condition reporting module 222 to be executed by a CPU 230. In one implementation, the vehicle condition reporting tool 215 may be available at an online application store disposed at an application server (not shown), for example. A user may retrieve a copy of the vehicle condition reporting tool 215 from the server and "install" the retrieved copy of the vehicle condition reporting tool 215 on the end user device 200.

In other implementations, the end user device 200 is capable of executing a graphical interface (GUI) for an online vehicle condition reporting tool within a web browser application, such as Apple's Safari®, Google Android™ mobile web browser, Microsoft Internet Explorer®, etc. The web browser application may be implemented as a series of machine-readable instructions for receiving, interpreting, and displaying web page information (e.g. from web server 143) while also receiving inputs from the user.

Further, the portable device 200 includes a communication module 235, that facilitates wireless communication for data exchange over a mobile and/or wide area network, and a user interface 240. The user interface may include devices to receive inputs from a user, such as a keyboard, touchscreen, buttons, trackballs, etc., and display devices, such as liquid crystal displays (LCD), light emitting diodes (LED), organic light-emitting diodes (OLED), ePaper displays, etc.

Vehicle Condition Assessment

Figure 4:
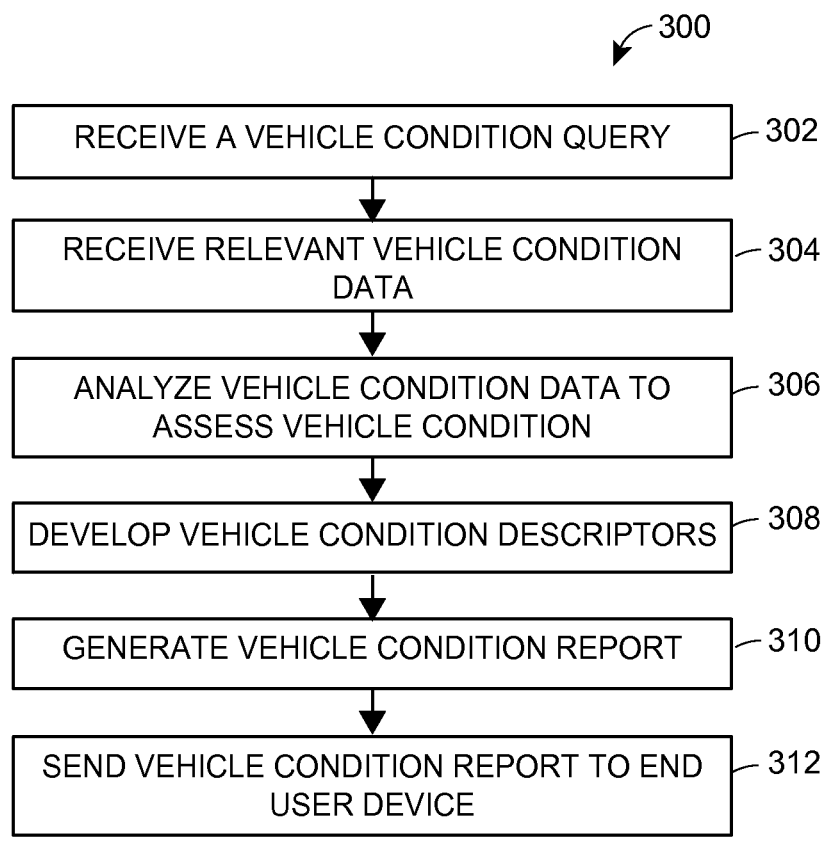
FIG. 4 is a flow diagram of an example method for assessing the condition of a vehicle which can be implemented in the example system illustrated in FIG. 1.

FIG. 4 is a flow diagram of an example method 300 for assessing the condition of a vehicle based on vehicle condition data. The method 300 may be implemented in the condition report server 102, for example.

To begin, a vehicle condition query is received from an end user device (block 302). In one scenario, a user of one of the end user devices 106 may locate a used car for sale and input, via a user interface, information identifying the used car, via a user interface to one of the end user devices 106. For example, the information identifying the used car may include a license plate number, license plate state, manufacturer name, model name or number, color, vehicle identification number (VIN), registered owner name, owner contact information, insurance policy number, etc. In turn, the one of the end user devices 106 may send a vehicle condition query, including the information identifying the vehicle, to the condition report server 102 to obtain an assessment of the condition (e.g. quality or market value) of the used car, in the example scenario. In another scenario, a user may be part of a company interested in a used car for the purposes of servicing the car, repairing the car, evaluating insurance claims, validating a VIN, assessing a customer's assets, etc. Such users may also input information identifying the used car, for example.

Upon receiving the vehicle condition query, condition data corresponding to the identified vehicle is retrieved from a vehicle condition database (block 304), such as condition database 115. In some implementations, the condition data may include data gathered from a variety of data sources, as described in U.S. application Ser. No. 13/897,646 entitled "Systems and Methods to Identify and Profile a Vehicle Operator" and filed on May 20, 2013, the entire disclosure of which is hereby incorporated by reference herein. By way of example and without limitation, such data sources may include: (i) sensors installed in vehicles, such as braking/acceleration/cornering sensors, tire pressure sensors, cameras, microphones, engine temperature sensors, mileage sensors, clocks, etc., (ii) sensors in mobile devices (e.g. smartphones, tablet computers, geopositioning receivers, etc.), where the mobile devices are temporarily disposed in vehicles, and (iii) third party databases (e.g. public record databases, insurance databases, etc.).

In some implementations, the condition data corresponding to the vehicle may be immediately descriptive of vehicle condition or descriptive of vehicle condition after manipulation. For example, data indicating vehicle mileage, year, and previous collisions/incidents may be immediately descriptive of the condition of a vehicle. On the other hand, engine rotations per minute (RPM), braking profiles, and geographic locations are example types of data that may be descriptive of the condition of a vehicle only after manipulation. In one scenario, an analysis of engine RPM data may indicate that a vehicle is frequently used for towing a trailer, and towing a trailer may be highly correlated with vehicle depreciation and/or high maintenance costs, example factors related to vehicle condition.

In some implementations, owners of used vehicles may receive incentives for contributing condition data for storage in a condition database. For example, car dealerships may offer more money to buy a car that has corresponding condition data recorded over the life of the car, as compared with a car that has no recorded condition data. In another example, an insurance company may provide coupons, discounts, or other rewards to customers that contribute condition data from insured vehicles.

The condition data stored in the condition database 115 may, in some implementations, be protected against fraud. For example, the condition data collected from used vehicles may be collected in real-time (i.e. wirelessly communicated to the condition server 102 immediately after being generated) and stored in a secure database (e.g. protected by authentication, encryption, etc.). In such a way, vehicle operators, or other interested persons, are prevented from modifying vehicle condition data to inaccurately reflect good/bad vehicle conditions.

Returning to FIG. 4, the condition data, retrieved from a vehicle condition database, is analyzed to assess the condition of the vehicle (block 306), in an implementation. For example, the condition report server 102 may analyze the condition data to assess the condition of the vehicle in relation to quality and value (e.g. maintenance, longevity, cost of ownership, mechanical operation, aesthetic condition, etc.)

In a simple example scenario, the condition report server 102 may retrieve geopositioning data, acceleration/braking/cornering data, and maintenance history data from the condition database 115. The maintenance history data may indicate that a vehicle has a history free of frequent or severe maintenance/repair issues. However, the geopositioning data may indicate that the vehicle has primarily been driven in the "salt belt" region of the United States (a region where vehicles commonly encounter corrosion due to the use of road salt) and the acceleration/braking/cornering data may indicate erratic and severe acceleration, braking, and/or cornering (i.e. reckless driving). In such an example scenario, the condition report server 102 may assess the condition of the vehicle as relatively low quality/value because of probable current and/or future issues caused by the driving environment and driving behavior.

A customer considering only the maintenance history and general vehicle information (e.g. mileage, make, model, year, etc.) may overvalue the used car, in the above scenario. In contrast, the techniques of the present disclosure are able to provide an accurate assessment of vehicle quality by collectively analyzing condition data gathered from the vehicle over time, such as the geopositioning and acceleration/braking/cornering data in the above scenario, for example.

In some implementations, the condition report server 102 may collectively or comparatively analyze the condition data to assess vehicle condition. For example, mileage data may indicate a relatively high mileage (e.g. 100,000 miles as compared with an average of 75,000 miles for cars of the same year), whereas geopositioning data may indicate that the vehicle is predominately driven in rural areas of the state of Arizona. Independently, the high mileage may indicate low quality or value. However, when combined with geopositioning data, from which one could infer mostly highway driving (i.e. rural driving) in a dry climate (Arizona), the condition report server 102 may more moderately assess the vehicle quality and value, in the example case.

The condition report server 102 may assess both the past and future condition of the vehicle in addition to the current condition of the vehicle, in some implementations. The condition report server 102 may use prediction, modeling, simulation, or other suitable algorithms to infer a condition of a vehicle at times in the past and predict conditions of a vehicle in the future, for example. A prediction algorithm (e.g. trained on reference data) may predict that a certain vehicle will need brake replacement in one year, transmission service in two years, and tire replacement in one and a half years, in an example scenario.

Also, the condition report server 102 may use prediction, modeling, etc. algorithms to accurately assess the current condition of a vehicle, even when condition data is not available over the entire life, or age, of the vehicle. For example, condition data may be available for only five out of ten years of the life of a vehicle. In such a case, a simulation/modeling algorithm may stitch together the available data with simulations to provide an accurate assessment of current vehicle condition.

Once the vehicle condition is assessed, vehicle condition descriptors reflecting the condition of the vehicle are developed (block 308). The condition descriptors may include any suitable representation or representations of the condition of the vehicle, in an implementation. The condition descriptors may include, by way of example: (i) scores or ratings representing relative quality, value, mechanical operation, etc., such as a score between one and one hundred or a rating of one to five stars; (ii) text statements reflecting a condition, such as "low," "moderate," or "high" cost of ownership, "this car may have major repair needs within two years," etc.; (iii) graphical representations of condition information, such as graphs, plots, or charts indicating average engine temperature as a function of time, maintenance/repair events per year, etc.; (iv) images or icons, such as a thumbs up/down, caution sign icons, etc.

Next, a vehicle condition report is generated to be presented on an end user device (block 310). In some implementations, the vehicle condition report includes some or all of the condition descriptors developed at block 308. For example, the condition report server 102 may generate a vehicle condition report in the form of one or more web pages including at least some of the condition descriptors, where the web pages may be displayed via a web browser application executed on the one or more end user devices 106.

In some implementations, the vehicle condition report is interactive. For example, the condition report server 102 may develop a vehicle condition report in the form of one or more interactive web pages or in the form of content for an interactive vehicle condition reporting application. An initial web page may display a general representation of vehicle condition, such as a series of scores or ratings, and, upon customer selection of a score or rating, further or modified web pages may display more detailed information, such as graphs, tables, etc. or even portions of the raw condition data itself, for example.

Finally, the vehicle condition report is sent to an end user device for presentation to a user (block 312). In some implementations, the condition report server 102 may initially send a partial vehicle condition report to the end user device, and then, based on user interaction with the report, the condition report server 102 may send additional portions of the vehicle condition report. Further, the condition report server 102 may generate and send variations of the vehicle condition report based on end user device configurations, in an implementation. For example, the condition report server may generate one variation of a vehicle condition report for a visually appealing display on a smartphone and another variation of a vehicle condition report for a visually appealing display on a tablet, laptop, or desktop computer.

Vehicle Condition Reporting

Figure 5:
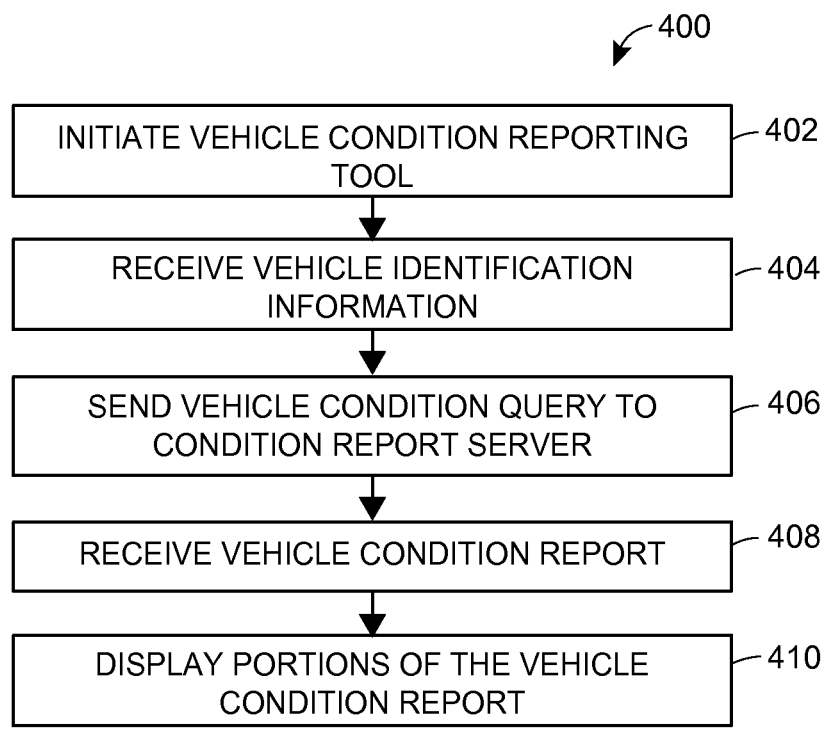
FIG. 5 is a flow diagram of an example method for reporting the condition of a vehicle which can be implemented in the example system illustrated in FIG. 1.

FIG. 5 is a flow diagram of an example method 400 for reporting vehicle condition information on an end user device. The method 440 may be implemented by the one or more end user devices 106, for example.

To begin, a vehicle condition reporting tool is initiated (block 402). In one implementation, one of the end user devices 106 may execute a vehicle condition reporting tool stored in memory (e.g. the vehicle condition reporting tool 215), where the vehicle condition reporting tool facilitates communications with the condition report server 102 and the display of vehicle condition reports. In another implementation, a user of one of the end user devices 106 may initiate a vehicle condition reporting tool via a web browser application.

Next, vehicle identification information is received via a user interface (block 404), such as the user interface 240. In some implementations, one of the end user devices 106 may display a series of forms, questions, buttons, etc. to prompt a user of one of the end user devices 106 to enter vehicle identification information. For example, one of the end user devices 106 may display a text box for entering a VIN number and a "continue" button such that the user may enter the VIN number via a keyboard or touchscreen and tap or click the continue button to confirm the identification information.

In another implementation, a user of an end user device may use sensors in the device itself to automatically generate vehicle identification information. For example, a camera on a smartphone may capture an image of a license plate or scan a bar code representing a VIN number. In such a case, the end user device may analyze the automatically generated data and, in some implementations, transform the data into convenient formats (e.g. text, numbers, etc.) for vehicle identification.

Once vehicle identification information is received, a vehicle condition query is sent to a condition report server (block 406). The vehicle condition query includes the vehicle identification information, and, in some implementations, the vehicle condition query includes device specific information. For example, the vehicle condition query may include device specific information indicating device configurations (e.g. hardware, software, etc.), device users (e.g. usernames, passwords, identification numbers, etc.), device locations, etc.

Returning to FIG. 5, a vehicle condition report is received in response to the vehicle condition query (block 408). For example, the condition report server 102 may electronically communicate the vehicle condition report to one of the end user devices as web content for display in a vehicle condition reporting tool or web browser. In addition, the condition report server 102 may send the vehicle condition report via email, text message, or hyperlink, for example.

In some implementations, the condition report server 102 may use device specific information to customize vehicle condition reports. For example, the condition report server may use a device location to generate a vehicle condition report emphasizing relevant vehicle condition descriptors (e.g. through prominent display, icons, bold text, etc.).

In one scenario, an end user device may be located in an area with severe winter weather, and, as such, the condition report server may generate a vehicle condition report that emphasizes mechanical operation issues, repair issues, etc. that would be particularly relevant in cold climates (e.g. problems with a four wheel drive differential, problems starting an engine in cold weather, etc.). In another example, the condition report server 102 may customize vehicle condition reports for individual device users. In one scenario, a device user may indicate (via a user interface) that maintenance issues are not as important as vehicle aesthetic condition (e.g. paint condition, body condition, etc.). As such, the condition report server 102 may display information regarding vehicles aesthetics predominately in a vehicle condition report or analyze data related to aesthetics in more detail, for example.

Upon receiving the vehicle condition report, all or part of the vehicle condition report is displayed (block 410). For example, one of the end user devices 106 may display interactive web pages or other interactive vehicle condition content, as described with reference to FIG. 4. In some implementations, one of the end user devices 106 may download or view the vehicle condition report as a document, such as a portable document format (PDF) document, Microsoft Excel® spreadsheet, or other suitable document. For example, one of the end user devices 106 may save a vehicle condition report document in computer-readable memory or print a vehicle condition report document for later viewing. Also, a user may "share" part or all of a vehicle condition report with friends, potential buyers, etc. via email, text message, hyperlink, Facebook®, etc., in some implementations An end user device or condition report server may compare vehicle condition reports for multiple vehicles to create a comparison chart, relative scoring or rating of vehicles, or other suitable representation of the comparison of vehicle condition reports, in an implementation. For example, a user may input multiple VIN numbers, or other vehicle identifications, to one of the end user devices 106, and, in response, the condition report server 102 may send one of the end user devices 106 a comparison of vehicle condition reports. Alternatively, a user may save multiple vehicle condition reports (generated at different times) in the memory of one of the end user devices 106 and select the multiple vehicle condition reports to generate a vehicle condition comparison.

We claim:

1. A computer-implemented method for assessing a condition of a vehicle, the method comprising:
   measuring sensor data including at least one of a geographic location of a vehicle, acceleration of the vehicle, speed of the vehicle, an engine temperature within the vehicle, a tire pressure within the vehicle, or an amount of mileage traveled by the vehicle, by (i) a sensor within one of a smartphone or tablet computer temporarily disposed in a vehicle and (ii) two or more of a geopositioning receiver, a motion sensor, an engine temperature sensor, a mileage sensor, or a tire pressure sensor disposed in the vehicle, wherein the sensor data is generated while the vehicle is being operated;
   transmitting, by one or more of an on-board computing device within the vehicle, the smartphone, or the tablet computer temporarily disposed in the vehicle, the sensor data in real-time to a first computing device and securely storing, by one or more processors in the first computing device, the sensor data using authentication or encryption to prevent vehicle operators from modifying the sensor data to inaccurately reflect a condition of the vehicle;
   receiving, at the one or more processors from a second computing device, a vehicle condition query via a computer network, wherein the vehicle condition query includes an identification of the vehicle;
   retrieving, by the one or more processors, condition data corresponding to the vehicle from a vehicle condition database, wherein the condition data is based on the sensor data,
   determining, by the one or more processors, the condition of the vehicle based on a collective analysis of the condition data gathered over a period of time, wherein the condition of the vehicle includes a market value of the vehicle and an overall quality level of the vehicle, including:
   identifying, by the one or more processors, at least one component of the vehicle which needs to be repaired or replaced by analyzing the sensor data measured over a time period;
   receiving, at the one or more processors, a geographic location of the second computing device and identifying a climate associated with the geographic location;
   generating, by the one or more processors, a vehicle condition report, wherein the vehicle condition report includes an interactive image of a first set of one or more visual condition descriptors indicative of the condition of the vehicle and an image of a second set of the one or more visual condition descriptors presented in response to receiving a selection of one of the first set of the one or more visual condition descriptors via a user interface of the second computing device;
   customizing, by the one or more processors, the vehicle condition report according to the climate associated with the geographic location for the second computing device; and
   communicating, via the computer network, the vehicle condition report to the second computing device from the first computing device for presentation to a user of the second computing device.

2. The computer-implemented method of claim 1, wherein the identification of the vehicle includes at least one of a license plate number, license plate state, manufacturer name, year of manufacture, model name or number, color, vehicle identification number (VIN), registered owner name, owner contact information, or insurance policy number.

3. The computer-implemented method of claim 1, wherein the condition of the vehicle further includes a state of mechanical operation of the vehicle.

4. The computer-implemented method of claim 3, wherein the condition data includes one or more of indications of current or prior geographic locations, mileages of the operated vehicle, times, dates, behaviors of the user while operating the operated vehicle, collisions in which the operated vehicle was involved, repairs of the operated vehicle, information from a vehicle title corresponding to the operated vehicle, usage patterns of the operated vehicle, recalls corresponding to the operated vehicle, preferences of the user, or driving violations.

5. The computer-implemented method of claim 1, wherein determining a condition of the vehicle includes:
   determining, by the one or more processors, the condition of the vehicle at a point in time for which the condition data is available and that is proximate to a current point in time; and
   executing a simulation algorithm by the one or more processors to predict or simulate the condition of the vehicle at the current point in time or a future point in time.

6. The computer-implemented method of claim 5, wherein executing the simulation algorithm by the one or more processors to predict or simulate the condition of the vehicle at the current point in time or the future point in time includes at least one of:
   (i) predicting a current market value or a future market value,
   (ii) predicting a current need or a future need for vehicle maintenance or repair,
   (iii) determining one or more financially advantageous points in time to buy or sell the vehicle, or
   (iv) developing suggestions for improving the overall quality of the vehicle.

7. The computer-implemented method of claim 1, wherein the one or more visual condition descriptors include one of text, image, graph, plot, chart, or table based representations of the condition of the vehicle.

8. A computer-implemented method for reporting vehicle condition information on a computing device including a display device and a user interface, the method comprising:
   receiving, via the user interface, information identifying a vehicle;
   generating, by one or more processors in the computing device, a vehicle condition query, wherein the vehicle condition query includes the information identifying the vehicle and a geographic location of the computing device;
   sending, via a network interface at the computing device, the vehicle condition query to a server;
   receiving, via the network interface at the computing device, one or more visual condition descriptors indicative of a condition of the vehicle customized according to a climate associated with the geographic location of the computing device,
      wherein the one or more condition descriptors are based on a collective analysis of condition data gathered over a period of time, wherein the condition data is based on sensor data transmitted in real-time including at least one of a geographic location of a vehicle, acceleration of the vehicle, speed of the vehicle, an engine temperature within the vehicle, a tire pressure within the vehicle, or an amount of mileage traveled by the vehicle, measured by (i) a sensor within one of a smartphone or tablet computer temporarily disposed in a vehicle and (ii) two or more of a geopositioning receiver, a motion sensor, an engine temperature sensor, a mileage sensor, or a tire pressure sensor disposed in the vehicle, wherein the sensor data is generated while the vehicle is being operated; and
      wherein the condition of the vehicle includes a market value of the vehicle, an overall quality level of the vehicle and an indication that at least one component of the vehicle needs to be repaired or replaced based on the sensor data, wherein the at least one component of the vehicle is identified by analyzing the sensor data measured over a time period; and
   rendering, by the one or more processors, an interactive image of a first set of the one or more visual condition descriptors for presentation on the display device;
   receiving a selection, via the user interface, of one of the first set of the one or more visual condition descriptors; and
   rendering an image of a second set of the one or more visual condition descriptors for presentation on the display device.

9. The computer-implemented method of claim 8, wherein the identification of the vehicle includes at least one of a license plate number, license plate state, manufacturer name, year of manufacture, model name or number, color, vehicle identification number (VIN), registered owner name, owner contact information, or insurance policy number.

10. The computer-implemented method of claim 8, wherein the condition data includes one or more of indications of current or prior geographic locations, mileages of the operated vehicle, times, dates, behaviors of the user while operating the operated vehicle, collisions in which the operated vehicle was involved, repairs of the operated vehicle, information from a vehicle title corresponding to the operated vehicle, usage patterns of the operated vehicle, recalls corresponding to the operated vehicle, preferences of the user, or driving violations.

11. The computer-implemented method of claim 8, wherein the one or more visual condition descriptors include one of text, image, graph, plot, chart, or table based representations of the condition of the vehicle.

12. The computer-implemented method of claim 8, wherein the second set of the one or more visual condition descriptors includes the first set of the one or more visual condition descriptors and additional condition descriptors.

13. The computer-implemented method of claim 8, further comprising:
   receiving, via the user interface, a request for a report of the condition of the vehicle;
   generating, by the one or more processors, the report of the condition of the vehicle, wherein the report includes rendered images of at least some of the one or more visual condition descriptors; and
   exporting the report to a user of the computing device.

14. The computer-implemented method of claim 13, further comprising sharing the report of the condition of the vehicle with a vehicle service and/or repair company via an electronic communication.

15. The computer-implemented method of claim 14, further comprising receiving, via the user interface, an update to the one or more visual condition descriptors from the vehicle service and/or repair company.

16. The computer-implemented method of claim 13, wherein exporting the report to the user of the computing device includes at least one of saving the report to one or more memories of the computing device, printing the report, or electronically communicating the report via email.

17. A computer device for assessing the condition of a vehicle, the computer device comprising:
   one or more processors; and
   one or more non-transitory memories coupled to the one or more processors;
   wherein the one or more memories include computer executable instructions stored therein that specifically configure the computing device such that, when executed by the one or more processors, the computer executable instructions cause the computer device to:
      receive a vehicle condition query via a computer network from a remote computing device, wherein the vehicle condition query includes an identification of a vehicle and a geographic location of the remote computing device;
      identify a climate associated with the geographic location;
      retrieve condition data corresponding to the vehicle from a vehicle condition database, wherein the condition data is based on sensor data transmitted in real-time to the vehicle condition database including at least one of a geographic location of a vehicle, acceleration of the vehicle, speed of the vehicle, an engine temperature within the vehicle, a tire pressure within the vehicle, or an amount of mileage traveled by the vehicle, measured by (i) a sensor within one of a smartphone or tablet computer temporarily disposed in a vehicle and (ii) two or more of a geopositioning receiver, a motion sensor, an engine temperature sensor, a mileage sensor, or a tire pressure sensor disposed in the vehicle, wherein the sensor data is generated while the vehicle is being operated;
      determine a condition of the vehicle based on a collective analysis of the condition data gathered over a period of time, wherein the condition of the vehicle includes a market value of the vehicle and an overall quality level of the vehicle, including:
  identifying at least one component of the vehicle which needs to be repaired or replaced by analyzing the sensor data measured over a time period;
generate a vehicle condition report including an interactive image of a first set of one or more visual condition descriptors indicative of the condition of the vehicle and an image of a second set of the one or more visual condition descriptors presented in response to receiving a selection of one of the first set of the one or more visual condition descriptors via a user interface of the remote computing device;
customize the vehicle condition report according to the climate associated with the geographic location of the remote computing device; and
communicate, via the computer network, the vehicle condition report to the remote computing device for presentation to a user of the remote computing device.

18. The computer device of claim 17, wherein the identification of the vehicle includes at least one of a license plate number, license plate state, manufacturer name, year of manufacture, model name or number, color, vehicle identification number (VIN), registered owner name, owner contact information, or insurance policy number.

19. The computer device of claim 17, wherein the condition of the vehicle further includes a state of mechanical operation of the vehicle.

* * * * *